(12) United States Patent
Hehn

(10) Patent No.: US 6,651,527 B2
(45) Date of Patent: Nov. 25, 2003

(54) SELF-BALANCING DEVICE

(75) Inventor: Werner Hehn, Erlangen (DE)

(73) Assignee: INA-Wälzlager Schaeffler oHG, Herzogenaurach (DE)

( * ) Notice: Subject to any disclaimer, the term of this patent is extended or adjusted under 35 U.S.C. 154(b) by 122 days.

(21) Appl. No.: 09/899,876

(22) Filed: Jul. 6, 2001

(65) Prior Publication Data

US 2002/0007695 A1 Jan. 24, 2002

(30) Foreign Application Priority Data

Jul. 19, 2000 (DE) .......................... 100 34 952

(51) Int. Cl.[7] ................................ F16F 15/22
(52) U.S. Cl. ................................ 74/573 R; 74/573 F
(58) Field of Search ................ 74/573 R, 573 F

(56) References Cited

U.S. PATENT DOCUMENTS

| | | | | |
|---|---|---|---|---|
| 3,282,127 A | * | 11/1966 | Deakin | 74/573 R |
| 3,410,154 A | * | 11/1968 | Deakin | 301/5.22 |
| 3,692,236 A | * | 9/1972 | Livshitz et al. | 422/64 |
| 3,696,688 A | | 10/1972 | Goodrich | 74/573 |
| 4,060,009 A | * | 11/1977 | Wyman | 301/5.22 |
| 4,075,909 A | | 2/1978 | Deakin | 74/573 R |
| 4,674,356 A | * | 6/1987 | Kilgore | 301/5.22 |
| 5,471,896 A | * | 12/1995 | Schierling et al. | 192/201 |
| 5,575,182 A | * | 11/1996 | Schierling et al. | 192/201 |
| 5,575,183 A | * | 11/1996 | Schierling et al. | 192/201 |
| 5,850,749 A | * | 12/1998 | Kim | 68/23.2 |
| 5,941,133 A | * | 8/1999 | Wierzba et al. | 74/572 |
| 6,119,547 A | * | 9/2000 | Goransson et al. | 210/144 |

FOREIGN PATENT DOCUMENTS

| | | |
|---|---|---|
| DE | 919 076 | 10/1954 |
| DE | 25 48 433 | 5/1976 |
| DE | 27 11 561 | 9/1978 |
| DE | 35 09 089 | 6/1988 |
| WO | WO 98/09096 | 3/1998 |

OTHER PUBLICATIONS

Richter–Voss: Baulemente der Feinmechanik, Fourth Edition, 1949.

* cited by examiner

Primary Examiner—Lenard A. Footland
Assistant Examiner—Julie K. Smith
(74) Attorney, Agent, or Firm—Henry M. Feiereisen

(57) ABSTRACT

A self-balancing device for a rotating machine part, includes an unbalance compensation disk, which is made through a non-cutting process and surrounds a rotation axis of a rotating machine element. A plurality of compensating masses is freely movable in an interior space of the compensation disk and assumes automatically a position to compensate an unbalance of the machine element. The compensation disk includes a first half shell and a second half shell having two axial partition planes, which are spaced from one another in a radial direction, wherein the first and second half shells are non-detachable connected to one another.

16 Claims, 5 Drawing Sheets

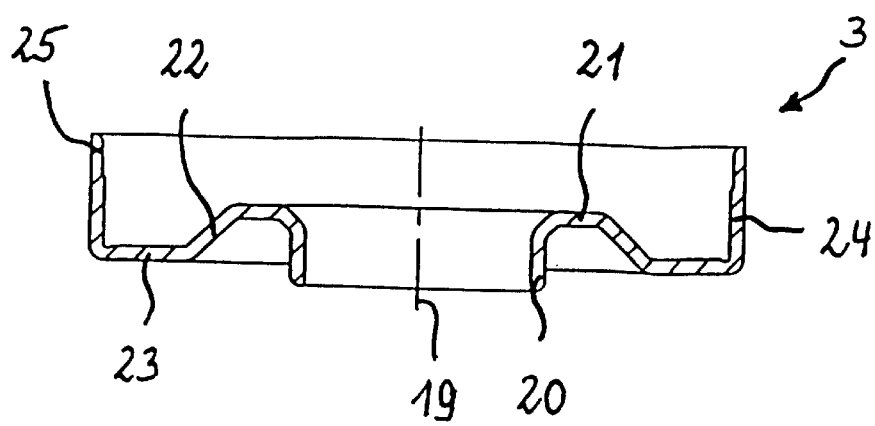
Fig. 4
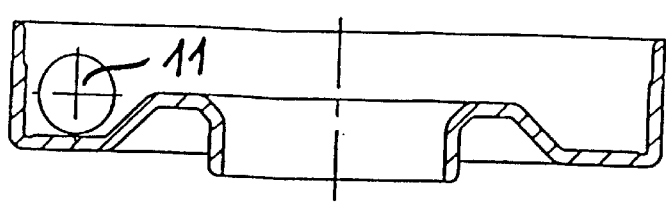
Fig. 5
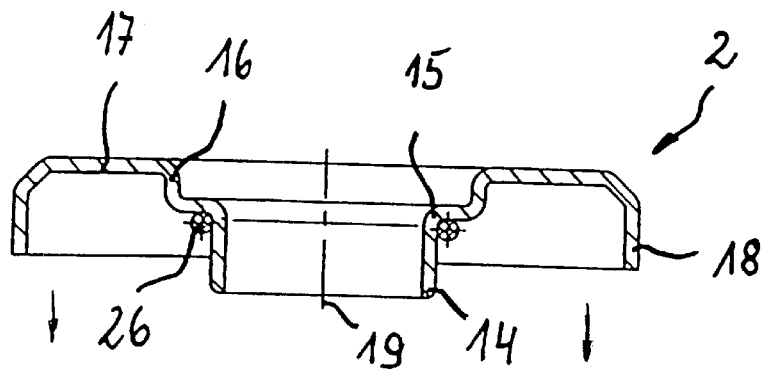
Fig. 6
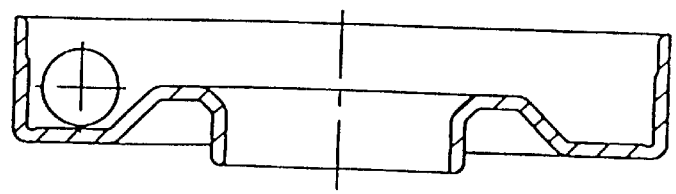

US 6,651,527 B2

SELF-BALANCING DEVICE

CROSS-REFERENCES TO RELATED APPLICATIONS

This application claims the priority of German Patent Application Ser. No. 100 34 952.8, filed Jul. 19, 2000, the subject matter of which is incorporated herein by reference.

BACKGROUND OF THE INVENTION

The present invention relates, in general, to a self-balancing device for a rotating machine part.

Machine parts normally have to a varying degree an unbalance which leads to noticeable effects, when the machine part rotates. For example, an unbalanced drum of a washer results in a creeping of the washer during the spinning stage. Other examples include hand machine tools, e.g. Hand grinders, which are caused to vibrate through imbalance of rotating parts. In a worst case scenario, such vibrations may result in bodily harm of the user.

Typically, such unbalance problems have been corrected heretofore by using compensating masses which move along a circular track. When arranged upon a shaft in proximity of an unbalance, the compensating masses tend to shift automatically to a position which is in opposition to the unbalance. In this way, a counterweight is formed for compensating the unbalance.

Self-balancing devices of this type are disclosed, for example, in German Pat. Nos. DE 919 076, DE 25 48 433, DE 27 11 561 and DE 35 09 089. Another example is disclosed in U.S. Pat. No. 4,075,909 which describes an automatic shaft balancer having a compensation ring which has an interior space for receiving balls and is made by a shaping process without material removal. The compensation ring of this type is complex in structure and requires many individual parts. As a consequence, manufacture and assembly is cumbersome and difficult, and sealing problems are encountered, when the interior space is filled with a damping fluid, because of the many existing partition gaps.

It would therefore be desirable and advantageous to provide an improved self-balancing device which obviates prior art shortcomings and which is easy to make while still reliable and fluid-tight in operation.

SUMMARY OF THE INVENTION

According to one aspect of the present invention, a self-balancing device for a rotating machine part, includes an unbalance compensation disk made through a non-cutting process and surrounding a rotation axis of a rotating machine element; and a plurality of compensating masses freely movable in the interior space and automatically assuming a position to compensate an unbalance of the machine element, wherein the compensation disk includes a first half shell and a second half shell having two axial partition planes spaced from one another in a radial direction, wherein the first and second half shells are non-detachable connected to one another.

Unlike prior art devices, the compensation disk of a self-balancing device according to the present invention includes two half shells which can be made in a simple manner in any desired shape or form through a non-cutting process and joined together. As only two partition planes exist, in applications, when damping fluid is used in the interior space of the compensation disk, the problem of leakage is no longer an issue and can easily be resolved.

According to another feature of the present invention, the first half shell has a first sleeve portion mounted to a shaft of the machine part, a second sleeve portion connected to one end of the first sleeve portion via a stepped offset and terminating in a radially extending disk-shaped ring which ends in a third sleeve portion.

According to another feature of the present invention, the second half shell has a first sleeve portion terminating in a first radially extending disk-shaped ring which ends in a slanted transition extending with respect to the rotation axis at an angle of <90° and terminating in a second radially extending disk-shaped ring which in turn is connected to a second sleeve portion.

Suitably, the first half shell may be subjected to a hardening process so as to reduce wear on the first half shell during travel of the compensating masses.

According to another feature of the present invention, the first and second half shells are interconnected by a flanged collar.

According to another feature of the present invention, the first sleeve portion of the second half shell embraces the first sleeve portion of the first half shell, and the second sleeve portion of the second half shell embraces the third sleeve portion of the first half shell.

When using damping fluid in the interior space of the compensation disk, it is suitable to dispose a seal arrangement between the first and second half shells. Suitably, a first sealing ring is disposed between the third sleeve portion of the first half shell and the second sleeve portion of the second half shell, and a second sealing ring is disposed between the first sleeve portion of the first half shell and the first sleeve portion of the second half shell. The third sleeve portion of the first half shell may be formed with a circumferential groove for receiving the second sealing ring, thereby preventing an escape of the second sealing ring during installation.

According to another feature of the present invention, the first and second half shells may be received by a massive intermediate ring. This intermediate ring may be used, optionally, to bridge installation space.

According to another feature of the present invention, the interior space of the compensation space is configured for receiving a liquid damping fluid, and the compensating masses may be configured as rolling bodies, such as ball members.

BRIEF DESCRIPTION OF THE DRAWING

Other features and advantages of the present invention will be more readily apparent upon reading the following description of a preferred exemplified embodiment of the invention with reference to the accompanying drawing, in which:

FIGS. 4 to 9 show sectional views of various process steps for making the compensation disk.

DETAILED DESCRIPTION OF PREFERRED EMBODIMENTS

Figure 1:
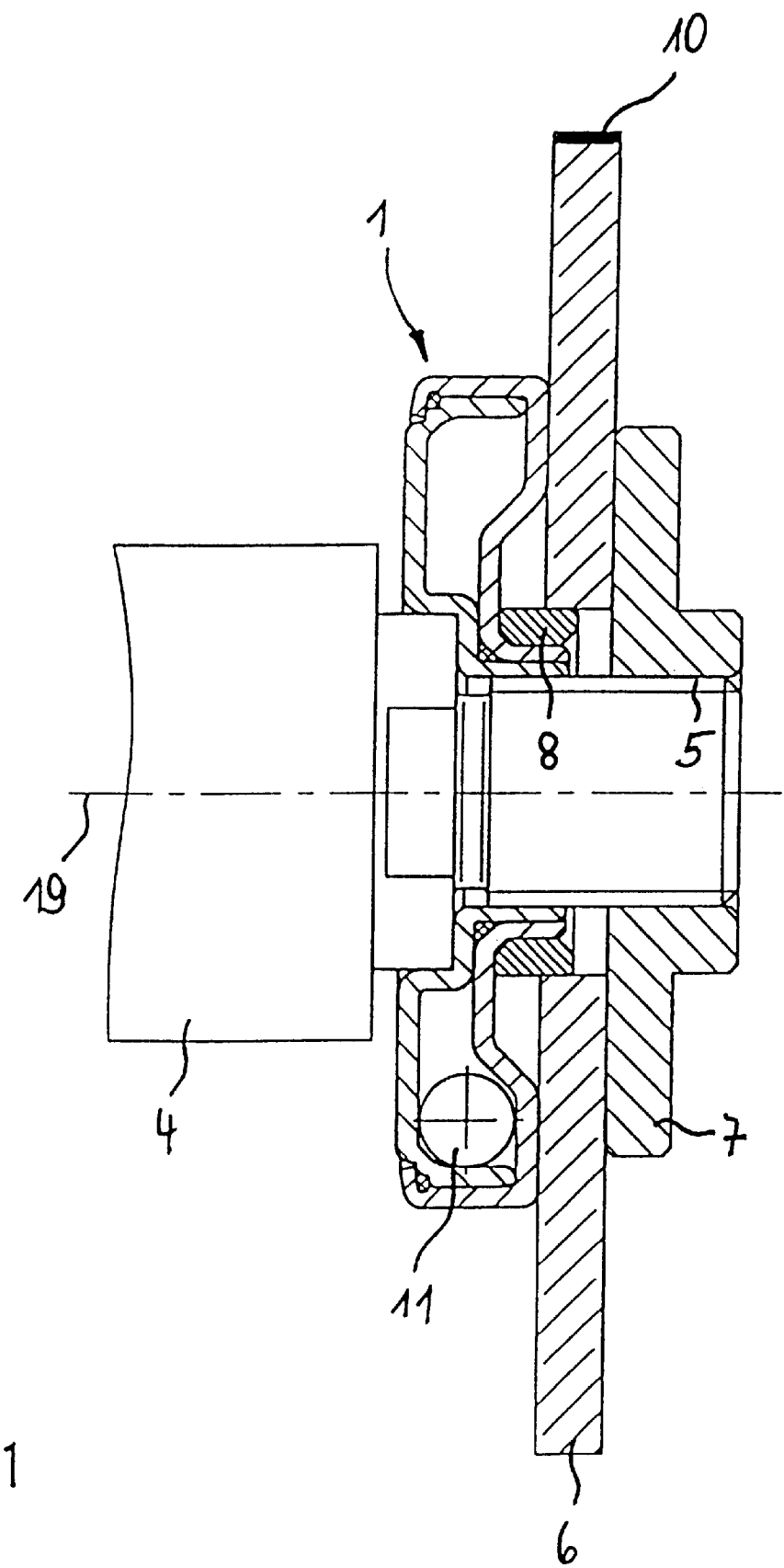
FIG. 1 is an axial section of a self-balancing device according to the present invention attached to a rotating machine part.

Throughout all the Figures, same or corresponding elements are generally indicated by same reference numerals.

Figure 2:
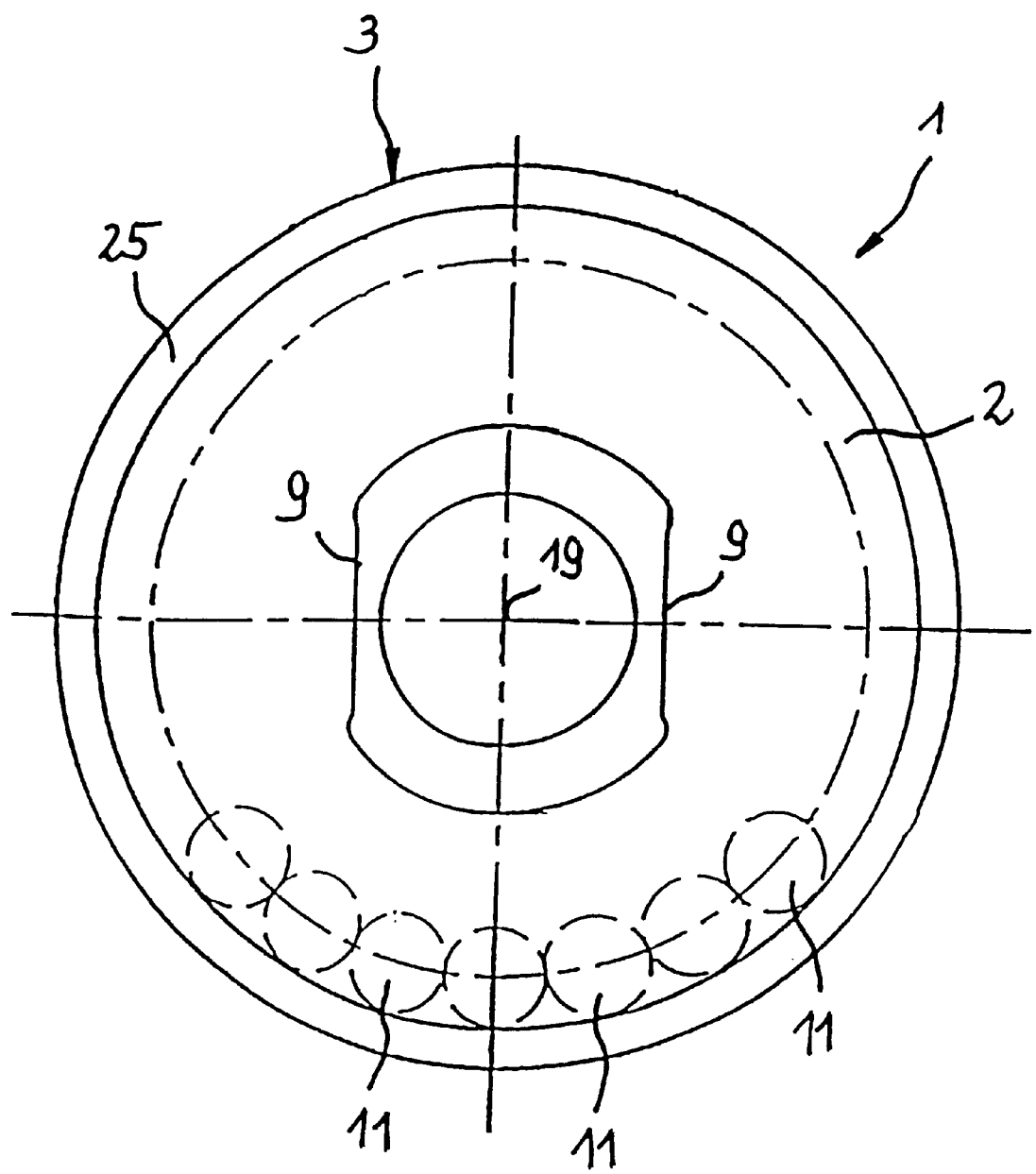
FIG. 2 is a side of the self-balancing device.

Turning now to the drawing, and in particular to FIG. 1, there is shown an axial section of a self-balancing device according to the present invention attached to a rotating machine part, for example a grinding wheel 6 which is mounted to a grinding spindle 4 rotating about a rotation axis 19. The self-balancing device includes an unbalance compensation disk, which is generally designated by reference numeral 1 and secured with the grinding wheel 6 on the grinding spindle 4 by a fastening nut 7 which is threadably engaged to a threaded section 5 of the grinding spindle 4. A radial installation space between the grinding spindle 4 and the grinding wheel 6 is bridged by an intermediate ring 8 which is made through a material removal process. As shown in FIG. 2, the compensation disk 1 has engagement surfaces 9 for abutment by the grinding spindle 4.

In the following description, the term "radial inward" will denote a direction toward the rotation axis 19, while the term "radially outward" will denote the opposite direction.

Figure 3:
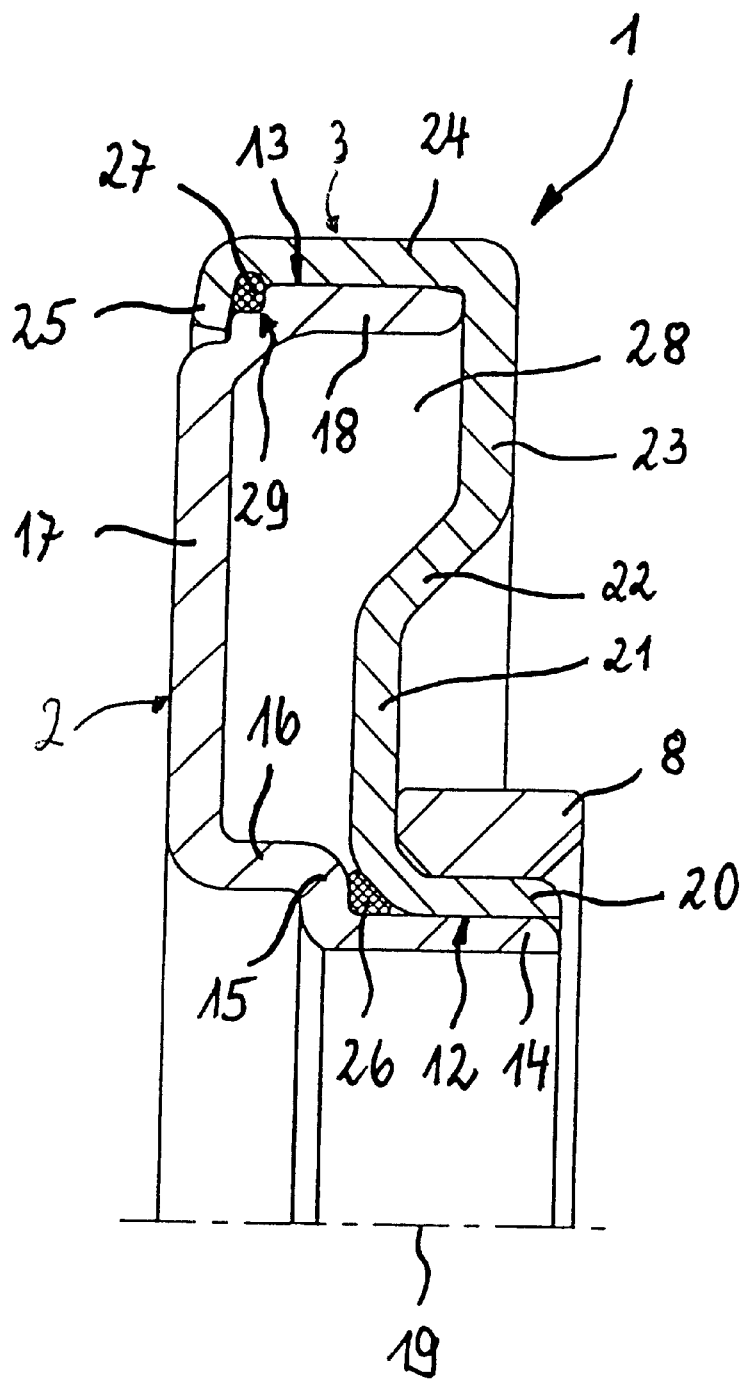
FIG. 3 is an axial half section, on an enlarged scale, of a compensation disk of the self-balancing device.
Figure 7:
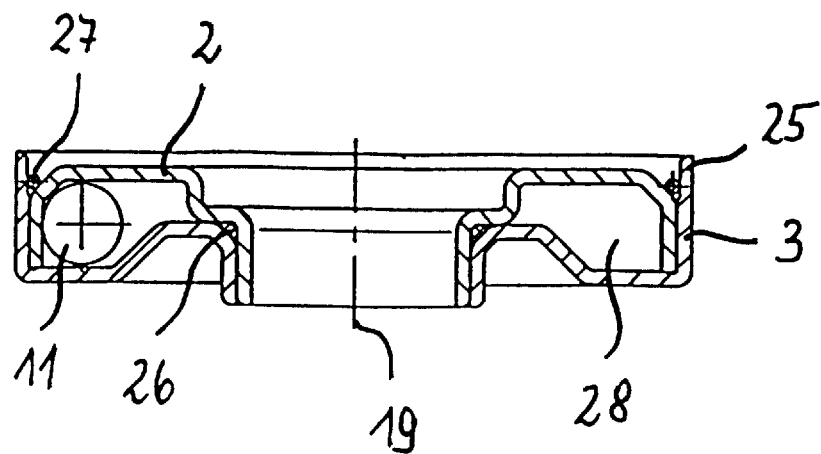

Referring now to FIG. 3, there is shown an enlarged axial half section of the compensation disk 1 which includes a housing in the form of a first half shell 2 and a second half shell 3 which are interconnected in an inner hub area and an outer circumferential joining area to thereby define two partition planes 12, 13 extending in axial direction and spaced from one another in a radial direction. The half shell 2 has a first sleeve portion 14, which is disposed radially inwards, and bears upon the grinding spindle 4 and is connected to a second sleeve portion 16 via a stepped offset 15. The sleeve portion 16 ends in a disk-shaped ring 17, which extends radially outwards and terminates in a third sleeve portion 18. The sleeve portions 14, 16, 18 extend parallel to the rotation axis 19. The second half shell 3 has a first sleeve portion 20, which ends in a radially outwardly directed disk-shaped ring 21. A slanted transition 22 connects the disk-shaped ring 21 with a disk-shaped ring 23 and extends radially outwards at an angle of <90° with respect to the rotation axis 19. The disk-shaped ring 23 ends in a second sleeve portion 24 whereby the sleeve portions 20, 24 extend in parallel relationship to the rotation axis 19 but in opposite axial directions.

As shown in FIGS. 1 and 3, the half shells 2, 3 are so interconnected that the sleeve portion 14 of the half shell 2 embraces with its outer surface area the sleeve portion 20 of the half shell 3, and the sleeve portion 18 of the half shell 2 embraces with its outer surface area the sleeve portion 24 of the half shell 3. An inwardly turned flange 25 of the sleeve portion 24 surrounds the sleeve portion 18 of the half shell 2 to thereby ensure the integrity of the interconnection of the half shells 2, 3. When assembled together, the half shells 2, 3 confine a ring-shaped interior space 28 for receiving a plurality of rolling bodies, such as ball members 11. Thus, in the event the grinding wheel 6 has an imbalance, e.g. An imbalance 10 at an upper circumferential position of the grinding wheel 6, as shown in FIG. 1, the ball members 11 tend automatically to travel to a position which is opposite to the imbalance 10, as depicted in FIGS. 1 and 2. As viewed in radial direction from inside to outside, the interior space 28 expands in axial direction as a consequence of the slanted transition 22. This is advantageous during assembly of the compensation disk 1, as damping fluid, such as oil, will not leak and is safely retained in the formed depression of the ring-shaped interior space 28. In addition, the ball members 11 are securely guided in radial direction by the formed narrowing of the ring-shaped interior space 28.

As further shown in FIGS. 1 and 3, the fluid-tightness of the compensation disk 1 to the outside is realized by incorporating a sealing arrangement between the half shells 2, 3, including a first sealing ring 26, such as an O ring, disposed between the stepped offset 15 of the half shell 2 and the juncture area between the sleeve portion 20 and disk-shaped ring 21 of the second half shell 3. A second sealing ring 27, such as an O ring, is disposed between the sleeve portion 18 of the half shell 2 and the sleeve portion 24 of the half shell 3 and is pressed by the flange 25 against the sleeve portion 18. Suitably, the half shell 2 is formed in the area of the sleeve portion 18 with a circumferential groove 29, so that the sealing ring 27 can be slightly press-fitted between the groove 29 and the sleeve portion 24 of the half shell 3, before the end of the sleeve portion 24 is turned inwards to form the flange 25.

Figure 8:
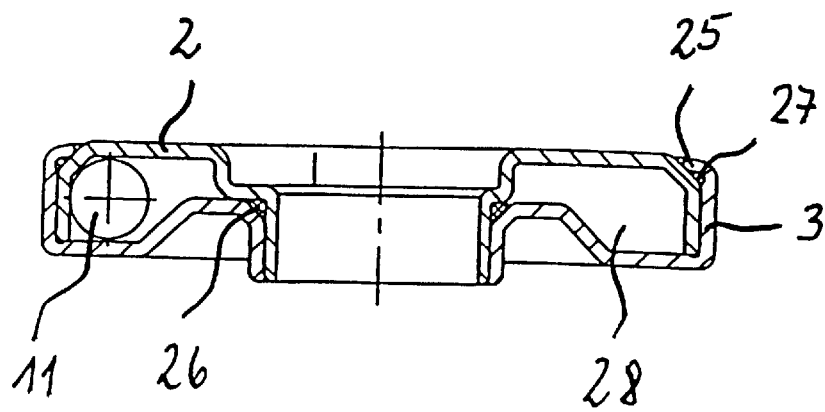
Figure 9:
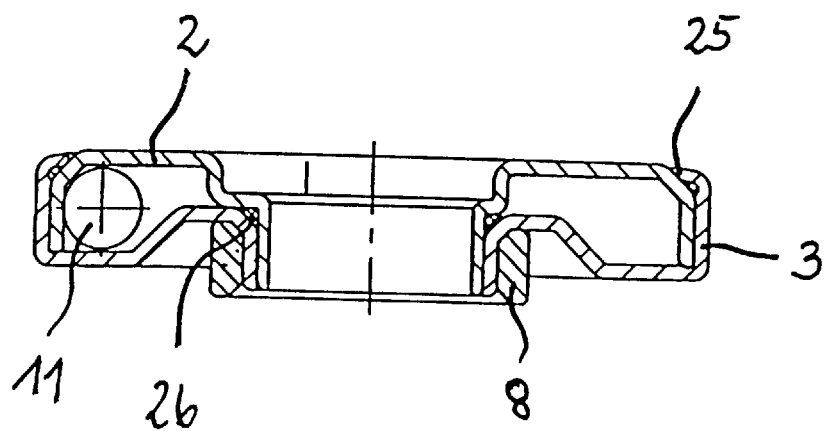

Assembly of the compensation disk 1 will now be described with reference to FIGS. 4 to 9. FIG. 4 shows a base configuration of the half shell 3 with sleeve portions 20, 24, disk-shaped rings 21, 23, transition 22, before inward turning of the end of sleeve portion 24 to form the flange 25. The half shell 3 is positioned substantially horizontal and a predetermined number of ball members 11 is placed in the depression bounded by the disk-shaped ring 23, sleeve portion 24, and transition 22. Optionally, damping fluid may also be filled into this area. FIG. 6 shows a base configuration of the half shell 2 with sleeve portions 14, 16, 18, stepped offset 15 and disk-shaped ring 17, including disposition of the sealing ring 26 which has been placed over the sleeve portion 14. The half shell 2 is then inserted into the half shell 3 in a direction indicated by the arrows until realizing the assembly stage, shown in FIG. 7, thereby forming the ring-shaped interior space 28. Subsequently, the sealing ring 27 is placed between the sleeve portion 18 of the half shell 2 and the sleeve portion 24 of the half shell 3, and the end of the sleeve portion 24 is turned inwards, thereby pressing the sealing ring 27 against the sleeve portion 18. This stage is shown in FIG. 8. After press-fitting the intermediate rings over the sleeve portion 20 of the half shell 3, the compensation disk 1 is ready for installation, as shown in FIG. 9.

While the invention has been illustrated and described as embodied in a self-balancing device, it is not intended to be limited to the details shown since various modifications and structural changes may be made without departing in any way from the spirit of the present invention.

What is claimed as new and desired to be protected by Letters Patent is set forth in the appended claims:

What is claimed is:

1. A self-balancing device for a rotating machine part, comprising:

an unbalance compensation disk made through a non-cutting process and surrounding a rotation axis of a rotating machine element, said compensation disk having a ring-shaped interior space; and a plurality of compensating masses freely movable in the interior space and automatically assuming a position to compensate an unbalance of the machine element, wherein the compensation disk includes a first half shell and a second half shell having two axial partition planes offset from one another in axial and radial directions.

wherein the first and second half shells are non-detachable connected to one another.

2. The self-balancing device of claim 1, wherein the first half shell has a first sleeve portion mounted to a shaft of the machine part and having one end, a second sleeve portion having opposite ends, one end connected to the end of the first sleeve portion via a stepped offset, a disk-shaped ring extending in the racial direction and having opposite ends, one end connected to the other end of the second sleeve portion, and a third sleeve portion having one end connected to the other end of the disk-shaped ring.

3. The self-balancing device of claim 1, wherein the second half shell has a first sleeve portion having one end, a first disk-shaped ring extending in the radial direction and having opposite ends, one end connected to the one end of the first sleeve portion, a slanted transition extending with respect to the rotation axis at an angle of <90° and having opposite ends, one end connected to the other end of the first disk-shaped ring, a second disk-shaped ring extending in the radial direction and having opposite ends, one end connected to the other end of the transition, and a second sleeve portion connected to the other end of the second disk-shaped ring.

4. The self-balancing device of claim 1, wherein the first half shell is subjected to a hardening process.

5. The self-balancing device of claim 1, wherein the first and second half shells are interconnected by a flanged collar.

6. The self-balancing device of claim 2, wherein the second half shell has a first sleeve portion, which embraces the first sleeve portion of the first half shell, and a second sleeve portion, which embraces the third sleeve portion of the first half shell.

7. The self-balancing device of claim 1, and further comprising a seal arrangement disposed between the first and second half shells.

8. The self-balancing device of claim 6, and further comprising a first sealing ring disposed between the third sleeve portion of the first half shell and the second sleeve portion of the second half shell, and a second sealing ring disposed between the first sleeve portion of the first half shell and the first sleeve portion of the second half shell.

9. The self-balancing device of claim 8, wherein the third sleeve portion of the first half shell is formed with a circumferential groove for receiving the second sealing ring.

10. The self-balancing device of claim 1, and further comprising an intermediate ring for receiving the first and second half shells.

11. The self-balancing device of claim 1, wherein the interior space is configured for receiving a damping liquid, wherein the compensating masses are configured as balls.

12. A self-balancing device for a rotating machine part, comprising:

a housing placed adjacent a rotating machine part and having two housing parts nested within one another and so configured as to connect in two contiguous connection areas in radial and axial spaced-apart offset relationships; and a plurality of rolling bodies freely movable in an interior space of the housing for compensating an unbalance of the machine element.

13. The self-balancing device of claim 12, wherein one of the housing parts has an inwardly turned flange for overlapping the other one of the housing parts and to thereby realize a non-detachable union between the housing parts.

14. The self-balancing device of claim 12, and further comprising a first seal member disposed in the one connection area between the housing parts, and a second seal member disposed in the other connection area between the housing parts.

15. A self-balancing device for a rotating machine part, comprising:

a housing placed adjacent a rotating machine part and having two housing parts nested within one another and configured as to connect only in an inner hub area and an outer circumferential joining area, with the inner hub area and the outer circumferential joining area extending in axial direction and spaced from one another in offset radial and axial directions; and a plurality of rolling bodies freely movable in an interior space of the housing for compensating an unbalance of the machine element.

16. The self-balancing device of claim 15, and further comprising a first seal member disposed in the inner hub area between the housing parts, and a second seal member disposed in the outer circumferential joining area between the housing parts.

* * * * *